Aug. 15, 1950     R. M. SHAVER     2,519,079
RAILWAY CAR ROOF
Filed Nov. 4, 1946     4 Sheets-Sheet 3
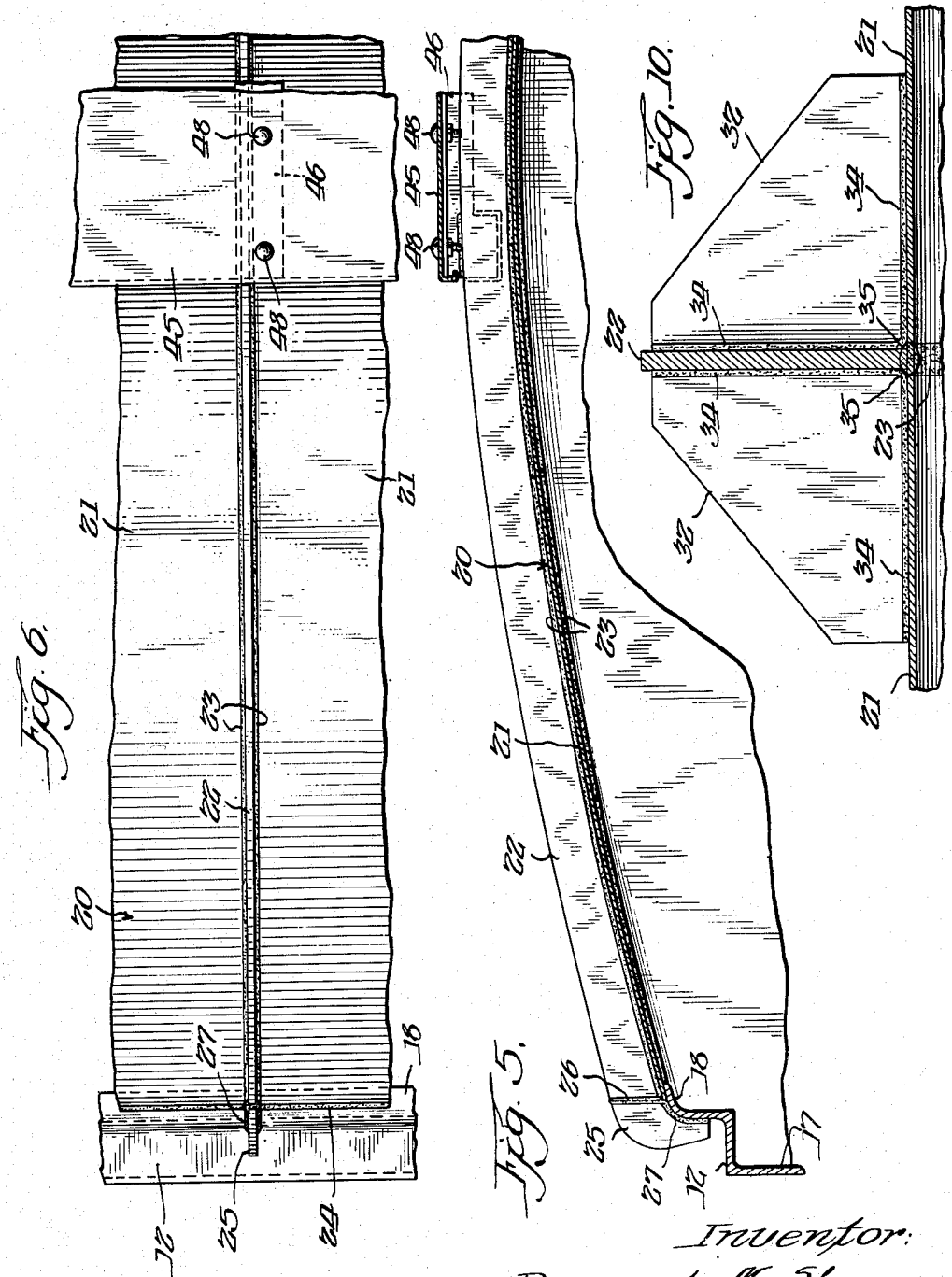
Inventor:
Raymond M. Shaver
By Oscar Hochberg, Atty.

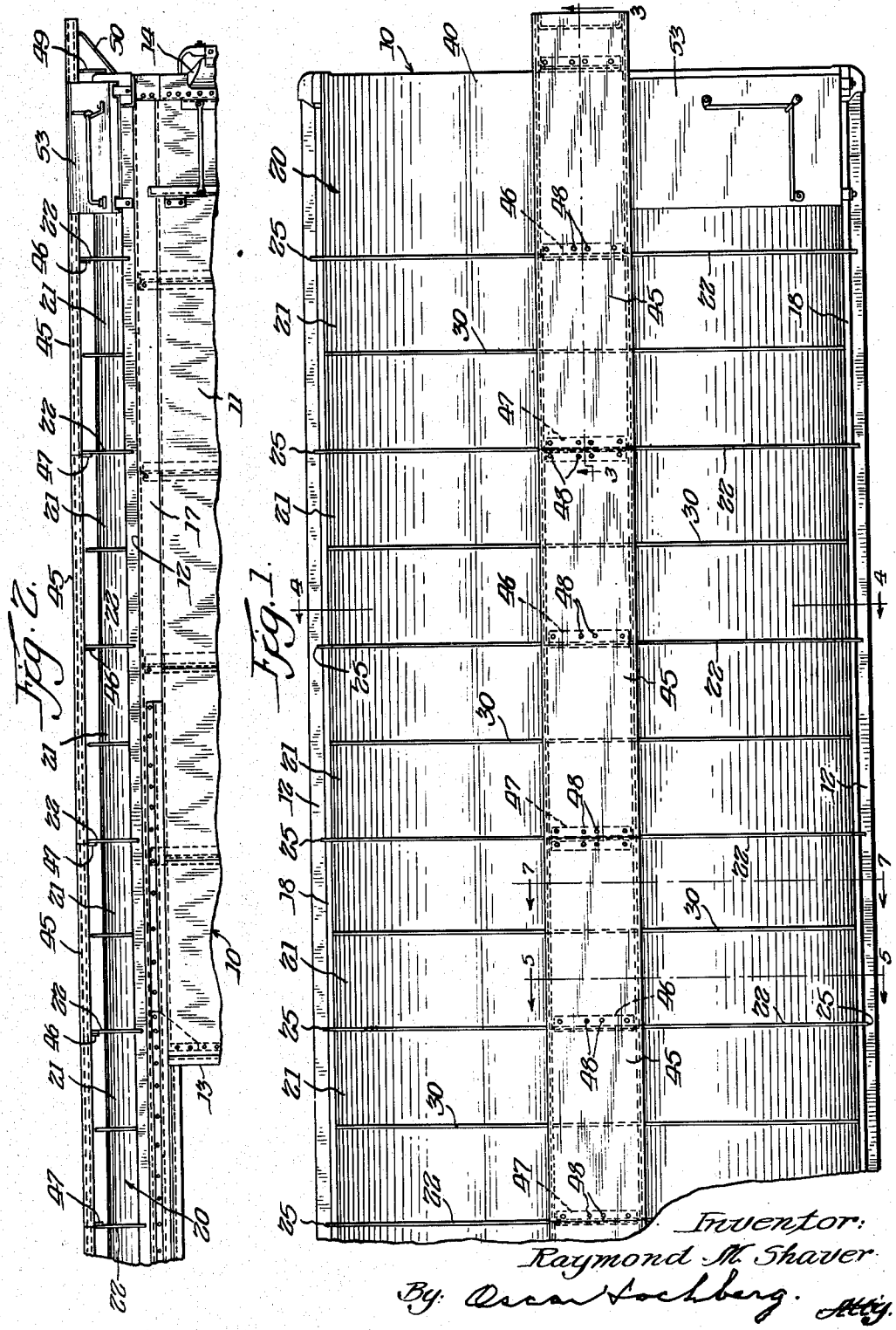

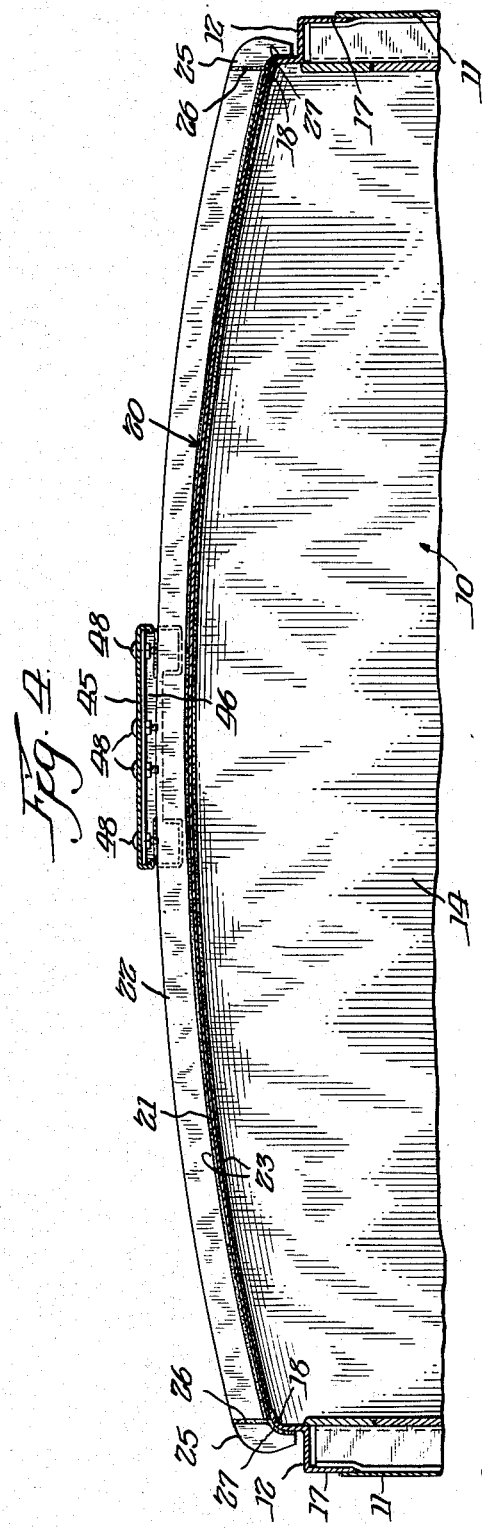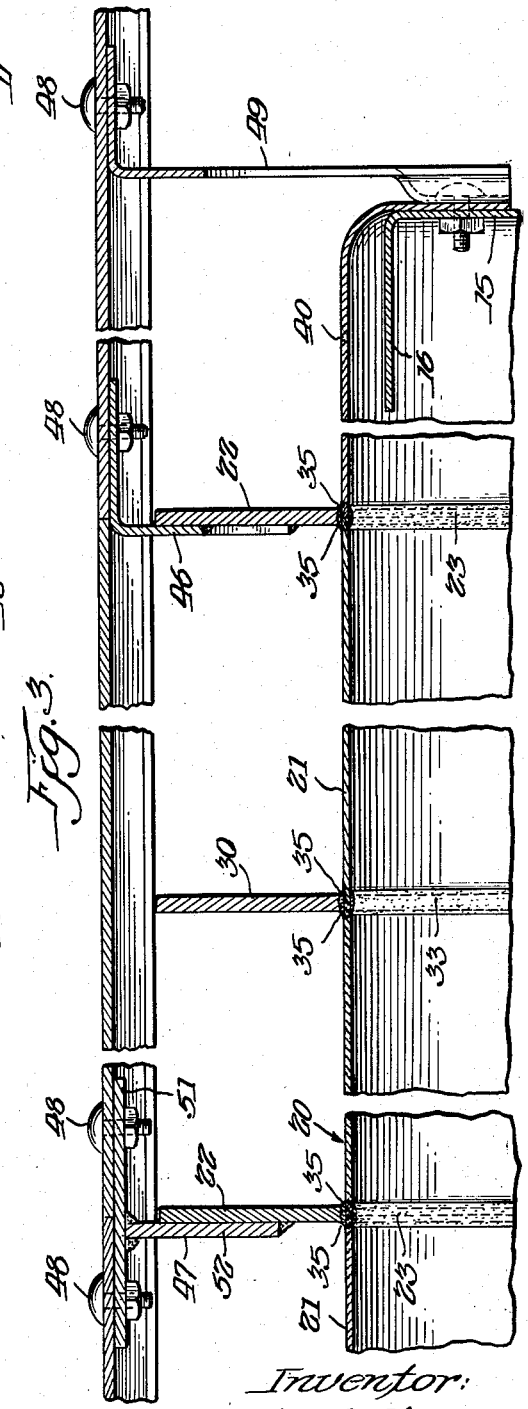

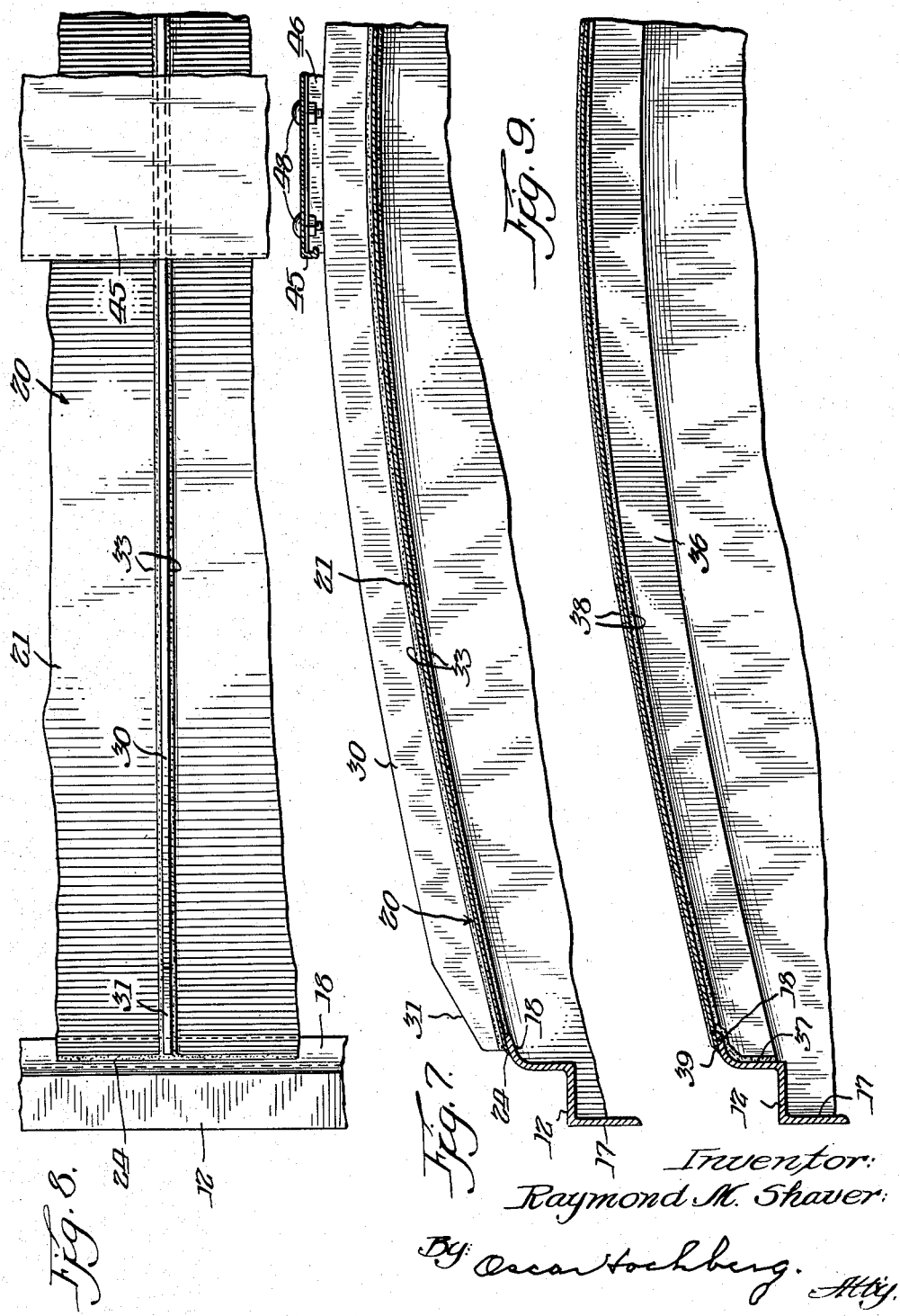

Patented Aug. 15, 1950

2,519,079

UNITED STATES PATENT OFFICE 2,519,079

RAILWAY CAR ROOF

Raymond M. Shaver, Michigan City, Ind., assignor to Pullman-Standard Car Manufacturing Company, Chicago, Ill., a corporation of Delaware Application November 4, 1946, Serial No. 707,609

13 Claims. (Cl. 108—5.4)

This invention relates to a roof construction for railway cars and has particular reference to a roof for freight cars and principally for railway house cars.

The invention has for its primary object the provision of a roof construction for box cars and which is of all-welded design adapted to be fabricated as a unitary structure for installation on the car as a unit.

An important object of the invention is realized in the provision of a freight car roof constructed from flat sheets extending transversely of the car from side plate to side plate on a continuous arc and arranged in edge to edge relation, with flat plate carline members disposed edgewise at the joints between the roof sheets and wherein the assembly is integrally secured by arc welding.

Another object of the invention lies in the provision of an arcuate roof for freight cars having the roof sheets arranged in edge to edge relation and extending continuously between the side plates, with flat plate carline members disposed edgewise at the joints between the roof sheets and the assembly integrated by welding into a unitary structure, and wherein the carline members at the roof sheet joints have extensions beyond the roof sheets and over the carlines for attachment thereto, and having intermediate roof sheet stiffener carlines therebetween coextensive only with the roof sheets.

A further object of the invention comprises the provision of a roof adapted for fabrication by automatic arc welding and which is of simple but rugged design, easily fabricated and of light but strong construction.

The foregoing and other and more specific objects of the invention are attained by the arrangement and construction illustrated in the accompanying drawings, in which—

Fig. 1 is a general plan view of a railway box car roof constructed in accordance with this invention and showing the series of roof sheets disposed in edge abutting relationship, running from side plate to side plate, with upstanding flat carline members disposed edgewise at the joints between the roof sheets, having extensions beyond the roof sheets over the respective side plates and provided with intermediate stiffener carlines coextensive with the roof sheets, the whole assembly being integrated by arc welding;

Fig. 2 is a side elevational view of the roof as attached to the end and side plates of the box car and showing the upstanding carlines at the joints between the roof sheets, with the intermediate stiffener carlines therebetween and the running board for the car supported from brackets secured to alternate carlines comprising those at the roof sheet joints;

Fig. 3 is a longitudinal sectional view taken on the line 3—3 of Fig. 1 showing the roof construction with portions broken out, and clearly revealing the arrangement of the upstanding carlines at the meeting edges of adjoining roof sheet panels, with the weld ingot joining the two roof sheets and carline at each joint and the intermediate carline members similarly secured through the roof sheet panels;

Fig. 4 is a transverse sectional view through the roof taken on the line 4—4 of Fig. 1, showing the construction of the roof on a continuous arc from side plate to side plate, with the upstanding carlines similarly formed and having extensions over the side plates, and the whole assembly integrated by arc welding;

Fig. 5 is a detail cross sectional view to larger scale taken on the line 5—5 of Fig. 1, showing the roof sheets supported on the inwardly directed upper flange of the side plate to which they are welded along their exposed edge, and having the upstanding flat plate carline member coextensive with the roof sheets, and with a separate plate shaped to the side plate and welded thereto and to the carline plate to provide an extension thereof over the side plate;

Fig. 6 is a detail plan view of the carline, roof sheet and side plate connection illustrated in Fig. 5, and showing the welded seam of the roof sheets to the side plate and the carline extending over the joint between the adjoining roof panels, with the separate plate integrally welded to the carline at the end, on the edge of the roof sheets, and providing an extension lying over and secured by welding to the side plate;

Fig. 7 is a detail cross section view similar to Fig. 5, taken on the line 7—7 of Fig. 1, but illustrating the attachment of the roof to the side plate at one of the intermediate stiffener carline members, showing the roof sheet welded at its exposed edge to the side plate, with the carline standing edgewise on top of the roof panel to which it is secured by arc welding therethrough and tapering downwardly toward the edge of the roof sheet, where it terminates;

Fig. 8 is a detail plan view of the connection of the roof to the side plate at the position of the intermediate stiffener carline, showing the upstanding carline member coextensive only with the roof sheet and the roof sheet welded along its edge to the side plate;

Fig. 9 is a transverse sectional view similar to

Fig. 4, but illustrating only a portion of the width of the car and showing a modified form of the invention wherein the flat plate carline members, both at the joints between roof sheets and at the intermediate positions, are disposed at the inner side of the arcuate roof sheets, depending within the car and secured by welding to the upper flange and web of the side plate and to the roof sheets; and Fig. 10, on Sheet 3 of the drawings, is a fragmentary detail longitudinal sectional view through the roof, taken approximately at the position of the ridge, showing to larger scale the manner of arc welding the carline and associated roof sheets into an integral weathertight assembly and illustrating a modification of the structure in the provision of gusset members upon opposite sides of the carline at the ridge position and secured therebetween by welding.

The car roof of this invention affords a light weight construction having excellent strength characteristics, and which is designed for automatic arc welding in such manner as to provide an improved roof adapted to be constructed at less cost than other roofs of comparable weight and strength characteristics. The roof is comprised of a plurality of transversely extending roof sheets arranged in edge abutting relationship, with carline members disposed at the juncture of adjoining panels and integrated therewith by arc welding, with intermediate carlines disposed therebetween to stiffen the roof sheets. The roof sheets are formed on a continuous arc from side plate to side plate, and the carline members are similarly formed to complement the roof sheets, and when the carlines and sheets are secured together, this arcuate formation further increases the rigidity and load supporting capacity of the roof.

In the drawings, 10 represents a railway box car having side walls 11 surmounted by side plates 12 and including doorways 13, and having end walls 14 including end plates 15. The end plate is provided with an inwardly directed flange 16 over which the roof extends, and the side plates 12 each comprise a W-section including an outer depending flange 17 to which the side wall 11 is secured, and an inwardly directed upper flange 18 upon which the roof is supported. The roof is indicated at 20, and in the drawings approximately only half of the roof is illustrated, comprising one half the length of a car, but the structure is symmetrical about the transverse center line of the car and therefore a description of the roof as shown will suffice for the entire structure.

The roof 20 is comprised of a plurality of roof sheets 21 disposed transversely of the car and extending continuously, on the radius of an arc, from one side plate 12 to the other, as best indicated in Fig. 4. The roof sheets are arranged in adjoining relation and disposed directly edge to edge to provide a continuous and unbroken covering for the car. Upstanding carline members 22, coextensive with the roof sheets, are disposed directly over the edge abutting joints thus formed, and each secured in the same welding operation as the respectively adjoining roof sheets, so that one pass of the welding rod at each joint secures the carline and the adjoining roof sheets into an integrated assembly. These joints are arc welded as at 23, and this operation is performed in a jig in which the roof sheets and carlines are all set up for automatic arc welding to provide a complete roof assembly adapted to be installed on the car as a unit as disclosed in copending application Serial No. 23,783, filed April 28, 1948, for Roof Welding Machine. The arc welding operation is performed from the inner side, through the roof sheets at their adjoining edges, to the carlines.

On the car, the roof sheets 21 rest upon the inwardly directed upper flanges 18 of the side plates where they are integrally secured by a continuous arc welded seam 24 along each exposed edge at the respective sides of the car. The carlines 22, as best shown in Figs. 5 and 6, comprise flat plate members shaped to the arcuate contour of the car roof and extend across the full width of the roof coextensive with the roof sheets 21, but a complemental flat plate 25 at each end of the carline provides extensions thereof over the side plates. The plate 25 is of the same height and thickness as the carline member and disposed in end abutting relation therewith, where it is arc welded, as at 26, and is shaped to fit over the curvature of the side plate, where it is also arc welded, as at 27, thus to provide an integrated extension of the carline over the side plate and further to rigidify the carline and the roof as a whole.

The roof sheets 21 are provided with stiffeners intermediate the carlines 22, and which may be in the form of similar flat plate carlines welded to the individual panels and extending across the width of the roof. These intermediate carlines, as shown, comprise flat plate members 30 disposed in upstanding relation to the roof sheets and correspondingly shaped to fit the curvature thereof and extending continuously from one edge of the roof to the other, as best shown in Figs. 7 and 8. These carlines taper downwardly toward the roof sheets at their respectively opposite ends, as at 31, and are integrally secured to the roof sheets by arc welding, as at 33, performed from the inner side directly through the roof sheets as indicated in Fig. 3.

The curvature of the roof and the depth thereof, together with the corresponding shape of the carlines 22 and 30, is such that the roof is greatly stiffened and rigidified and the carlines caused to retain their normally upright positions at all times, but if desired, the carlines may be additionally braced and the roof structure further rigidified by means of gussets 32, as shown in Fig. 10, which are disposed upon respectively opposite sides of the several carlines. These gussets, when used, are located directly at the ridge position and are secured by arc welding at the sides thereof adjoining the carlines and roof sheets, as at 34, thereby to form an integrated part of the roof structure and stiffen the carline members against distortion relative to the roof sheets.

As best shown in Figs. 3 and 10, the continuous welding beads 23 and 33 integrating the carlines and roof sheets are formed through the roof sheets 21, and in section take the form of an elliptically shaped ingot integrally uniting these parts throughout the length of their contiguous areas. In actual practice, when the roof assembly is set up in the jig for the arc welding operations, the carlines and roof sheets are positioned by means of closely fitting copper backing plates or bars which are respectively shaped at that position where the carline joins the roof sheet to provide a rounded corner portion, which, in backing up the roof sheets and carlines during the welding process, causes the formation of a fillet 35 by the welding ingot at each side of the respective carlines at the juncture thereof with the roof sheets to provide a smooth, weathertight joint without openings or crevices to accumulate or hold moisture. As indicated in Fig. 10, the weld ingot at the respective carlines 22 is formed directly at the joint between the abutting edges of the adjoining roof sheets with the carlines and integrally unites these parts, including a portion of each within the ingot, as shown, but in the case of the stiffener carlines 30, the arc welding rod is applied from the inward side of the respective roof sheets, and the welding operation performed directly therethrough, substantially at the middle of the individual sheets.

A modification of the carline arrangements heretofore described is illustrated in Fig. 9, wherein all of the carlines are disposed inwardly of the roof. In this construction the roof presents an outwardly smooth surface and is formed on the same arcuate contour between side plates as the previous arrangement. The carline members 36 in this arrangement are all alike, both with respect to those at the joints between adjoining roof sheets and the stiffener carlines at the middle of each panel, and are disposed at the under side of the roof sheets. The carlines extend on the continuous arc of a radius between the inside vertical flanges of the side plates to which, and the inwardly extending upper flanges 18, they are arc welded, as at 37—the carlines being coped to fit the side plates, as required. The operation of arc welding the carlines and roof sheets into an integrated assembly is performed from the top or outer side of the roof sheets with the welding bead being indicated at 38. The roof sheets are continuously arc welded along their respectively opposite exposed edges to provide a weathertight seam 39.

In all of the designs disclosed, the carline members are formed from flat plates, and in practice a plurality of carlines are blanked out of a single sheet of metal by mass production methods, and from the economic standpoint and upon the basis of weight the flat plate carlines are to be preferred, and while a single arc welded seam may be preferred, a plurality of such seams might be utilized in securing each carline and with the adjacent edges of the roof sheets spaced apart. The design of the carline may depend upon the particular service for which a car is intended and the load supporting characteristics to be built into the roof, and while the carlines have all been shown as located upon either one side or the other of the roof, it is possible that it may be desirable to dispose carlines upon both sides of the roof or any combination of both inside and outside carline arrangements. The construction particularly lends itself to the design of automobile cars, where, with an outside carline arrangement, a pair of inside carlines may be disposed in each end section of the car to accommodate the auto loading devices used in these cars.

The end roof sheets 40 are shown as flanged over the outside of the end plate 15, but if desired, this end flange on the roof sheet may be eliminated and the end roof sheet 40 supported directly on the flange 16 of the end plate, where it may be secured by arc welding at the exposed edge to provide a weathertight seam. The roof is provided with a longitudinal running board comprised of aligned sections 45 supported from brackets 46 and 47 attached to the carlines 22. The running board is of metal and is secured to the supporting brackets by means of bolts 48. The ends of the running board are supported upon brackets 49 (see Fig. 3) bolted to the end plate 14 and braced by strut plates 50. The brackets 46 comprise angle shaped pressed plates welded to the carlines 22 and disposed intermediate the length of each running board section, while the brackets 47 supporting the adjoining running board sections at each joint, are comprised of a flat plate 51 upon which the running board sections are bolted and supporting plates 52 welded thereto, and which in turn are welded to the carlines 22. A latitudinal running board 53 is disposed between the longitudinal running board and the respectively adjacent side of the car at respectively opposite ends of the car.

From the foregoing it will be seen that an arc welded roof construction for railway freight cars has been provided which affords the most economical design consistent with strength requirements.

What is claimed is:

1. A railway freight car roof construction including a pair of side plate members spaced apart and having inwardly directed flanges, a plurality of transversely arranged roof sheet members supported upon said flanges, said roof sheets bridging the space between said side plates and disposed in edge abutting relation to each other to provide an even upper surface at the joints thus formed, a carline member at each joint comprising an upstanding flat plate shaped to the contour of the roof and coextensive therewith from side plate to side plate disposed edgewise at said joint entirely to the upper side of said even surface, complemental extension members disposed at respectively opposite ends of each of said carlines and extending in overlying relation to said side plates, and carline members disposed intermediate said first-named carlines and coextensive with each of the roof sheets and also comprising flat plates shaped to the contour of the roof, all of said members being integrally secured together by arc welding to provide a unitary roof structure, said last-named carlines being secured by arc welding directly through said roof sheet members.

2. A railway freight car roof construction including a pair of side plate members spaced apart and having inwardly directed flanges, a plurality of roof sheet members supported upon said flanges, said roof sheets extending between said side plates and disposed in edge abutting relation to each other to provide an even upper surface at the joints thus formed, a carline member at each joint comprising an upstanding flat plate shaped to the contour of the roof and extending continuously from side plate to side plate disposed edgewise at said joint entirely to the upper side of said even surface, and intermediate carline members disposed between said first-named carlines and also comprising flat plates shaped to the contour of the roof and extending from side plate to side plate, all of said members being integrally secured together by arc welding to provide a unitary roof structure, said intermediate carlines being secured by arc welding directly through said roof sheet members.

3. A railway freight car roof construction including a pair of side plate members spaced apart and having inwardly directed flanges, a plurality of roof sheet members supported upon said flanges, said roof sheets extending between said side plates and disposed in edge abutting relation to each other to provide an even upper surface at the joints thus formed, a carline member at each joint comprising an upstanding flat plate shaped to the contour of the roof and extending continuously from side plate to side plate disposed edgewise at said joint entirely to the upper side of said even surface, and intermediate carline members disposed between said first-named carlines and also comprising flat plates shaped to the contour of the roof and extending from side plate to side plate, all of said members being integrally secured together by arc welding to provide a unitary roof structure.

4. A railway freight car roof construction including a pair of side plate members spaced apart and having inwardly directed flanges, a plurality of roof sheet members supported upon said flanges, said roof sheets extending between said side plates and disposed in edge abutting relation to each other to provide an even upper surface at the joints thus formed, a carline member at each joint comprising an upstanding flat plate shaped to the contour of the roof and extending continuously from side plate to side plate disposed edgewise at said joint entirely to the upper side of said even surface, and complemental extension members disposed at respectively opposite ends of each of said carlines and extending in overlying relationship to said side plates, all of said members being integrally secured together by arc welding to provide a unitary roof structure.

5. A railway freight car roof construction including a pair of side plate members spaced apart and having inwardly directed flanges, a plurality of roof sheet members supported upon said flanges, said roof sheets extending between said side plates and disposed in edge abutting relation to each other to provide an even upper surface at the joints thus formed, and a carline member at each joint comprising an upstanding flat plate shaped to the contour of the roof and extending continuously from side plate to side plate disposed edgewise at said joint entirely to the upper side of said even surface, all of said members being integrally secured together by arc welding to provide a unitary roof structure.

6. A railway freight car roof construction including a pair of side plate members spaced apart and having inwardly directed flanges, a plurality of roof sheet members supported upon said flanges, said roof sheets extending continuously between said side plates and disposed in edge abutting relation to each other to provide an even surface at the joints thus formed, a carline member at each joint extending continuously from side plate to side plate disposed in edgewise engagement at the joint and extending entirely to one side of said even surface, and arc welded seams at the joints integrally securing the roof sheets and carlines.

7. A railway freight car roof construction including a pair of side plate members spaced apart, a plurality of roof sheet members supported upon said side plates, said roof sheets extending continuously between said side plates and disposed in edge abutting relation to each other to provide an even surface at the joints thus formed, a carline member at each joint extending continuously from side plate to side plate disposed in edgewise engagement at the joint and extending entirely to one side of said even surface, intermediate carline members disposed between said first-named carlines and extending from side plate to side plate, and arc welded seams at the joints integrally securing the roof sheets and carlines, said intermediate carlines being secured by seams arc welded directly through said roof sheet members.

8. A railway freight car roof construction including a pair of side plate members spaced apart, a plurality of roof sheet members supported upon said side plates, said roof sheets extending continuously between said side plates and disposed in edge abutting relation to each other to provide an even surface at the joints thus formed, a carline member at each joint extending continuously from side plate to side plate disposed in edgewise engagement at the joint and extending entirely to one side of said even surface, arc welded seams at the joints integrally securing the roof sheets and carlines, and intermediate carline members disposed between said first-named carlines and extending from side plate to side plate.

andhp

9. A railway freight car roof construction including a pair of side plate members spaced apart and having inwardly directed flanges, a plurality of transversely arranged roof sheet members supported upon said flanges, said roof sheets bridging the space and extending continuously between said side plates and disposed in edge abutting relation to each other to provide an even surface at the joints thus formed, a carline member comprising a flat plate disposed edgewise at each joint and extending from side plate to side plate entirely to one side of said even surface, arc welded seams at the joints integrally securing the roof sheets and carline members, and means stiffening said roof sheets intermediate said carlines.

10. A railway freight car roof construction including a pair of side plate members spaced apart, a plurality of roof sheet members supported upon said side plates, said roof sheets extending continuously between said side plates and disposed in edge abutting relation to each other to provide an even upper surface at the joints thus formed, a carline member at each joint extending continuously from side plate to side plate disposed in edgewise engagement at the joint and extending entirely to the upper side of said even surface, arc welded seams at the joints integrally securing the roof sheets and carline members, and intermediate carline members disposed between said first-named carlines and extending from side plate to side plate.

11. A railway freight car roof construction including a pair of side plate members spaced apart, a plurality of roof sheet members supported upon said side plates, said roof sheets extending continuously between said side plates and disposed in edge abutting relation to each other to provide an even surface at the joints thus formed, a carline member at each joint extending continuously from side plate to side plate disposed in edgewise engagement at the joint and extending entirely to the under side of said even surface, arc welded seams at the joints integrally securing the roof sheets and carline members, and intermediate carline members disposed between said first-named carlines.

12. A railway freight car roof construction including a pair of side plate members spaced apart, a plurality of roof sheet members supported upon said side plates, said roof sheets extending continuously between said side plates and disposed in edge abutting relation to each other to provide an even surface at the joints thus formed, a carline member at each joint extending continuously from side plate to side plate disposed in edgewise engagement at the joint and extending entirely to the upper side of said even surface, and arc welded seams integrally securing all of said members.

13. A railway freight car roof construction including a pair of side plate members spaced apart, a plurality of roof sheet members supported upon said side plates, said roof sheets extending continuously between said side plates and disposed in edge abutting relation to each other to provide an even surface at the joints thus formed, a carline member at each joint extending continuously from side plate to side plate disposed in edgewise engagement at the joint and extending entirely to the under side of said even surface, and arc welded seams integrally securing all of said members into a unitary structure.

RAYMOND M. SHAVER.

REFERENCES CITED

The following references are of record in the file of this patent:

UNITED STATES PATENTS

| Number | Name | Date |
|---|---|---|
| 2,034,385 | Bonsall | Mar. 17, 1936 |
| 2,120,349 | Bonsall | June 14, 1938 |